US009721704B2

(12) United States Patent
Sugimoto

(10) Patent No.: US 9,721,704 B2
(45) Date of Patent: Aug. 1, 2017

(54) WIRE COVER

(71) Applicant: Sumitomo Wiring Systems, Ltd., Yokkaichi, Mie (JP)

(72) Inventor: Shinpei Sugimoto, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 0 days.

(21) Appl. No.: 15/245,227

(22) Filed: Aug. 24, 2016

(65) Prior Publication Data

US 2017/0084362 A1 Mar. 23, 2017

(30) Foreign Application Priority Data

Sep. 17, 2015 (JP) ................................ 2015-183712

(51) Int. Cl.
*H02G 3/00* (2006.01)
*H01B 17/26* (2006.01)
*H01B 17/38* (2006.01)

(52) U.S. Cl.
CPC ............ *H01B 17/26* (2013.01); *H01B 17/38* (2013.01)

(58) Field of Classification Search
CPC ................................ H01B 17/38; H01B 17/26
USPC ........................................................ 174/70 R
See application file for complete search history.

(56) References Cited

U.S. PATENT DOCUMENTS

2002/0170736 A1* 11/2002 Yamashita ......... H01R 13/5837 174/84 R
2008/0064261 A1* 3/2008 Kobayashi ........... H01R 13/506 439/594
2015/0179301 A1* 6/2015 Suzuki .............. H01R 13/5825 174/68.3

FOREIGN PATENT DOCUMENTS

JP 2002-343497 11/2002

* cited by examiner

*Primary Examiner* — Sherman Ng
(74) *Attorney, Agent, or Firm* — Gerald E. Hespos; Michael J. Porco; Matthew T. Hespos

(57) ABSTRACT

A wire cover (10) is mounted on a rear surface of a housing (30) such that a bundle of wires (31) pulled out from a rear surface of the housing (30) is guided in a predetermined direction. The wire cover (10) includes a binding member (40) with a band (41) to be wound around the wires (31) and a lock (42) for locking the band (41) at a predetermined position. The bundle of the wires (31) is fixed by the binding member (40). The band (41) extends from a first outer surface (46) of the lock (42) and is inserted into the interior of the lock (42) from a second outer surface (47) of the lock (42) to be locked. First positioning portions (24) contacts the first surface (46) of the lock (42) and a second positioning portion (25) contacts the second surface (47) of the lock (42).

5 Claims, 19 Drawing Sheets

WIRE COVER

BACKGROUND

1. Field of the Invention

The present invention relates to a wire cover.

2. Description of the Related Art

Japanese Unexamined Patent Publication No. 2002-343497 discloses a connector with a housing and a wire cover mounted on a rear surface of the housing. A wire fixing portion is formed on the wire cover and has a U-shaped cross-section open on a front surface. A bundle of wires is pulled out in a predetermined direction from the rear surface of the housing and is fixed to the wire cover by winding a binding band. The binding band is tightened to press the bundle of wires against the inner side of the wire fixing portion.

However, in the configuration described above, the binding band may turn in a circumferential direction during a winding operation of the binding band and it may be difficult to tighten the bundle of wires sufficiently. Further, even after the binding band is wound, the binding band may turn in the circumferential direction and, for example, a lock of the binding band may project toward a side where there is a space limitation.

The invention was completed based on the above and aims to provide a wire cover capable of positioning a binding member for binding a bundle of wires in a circumferential direction.

SUMMARY

The invention is directed to a wire cover to be mounted on a rear surface of a housing. A bundle of wires is pulled out from the rear surface of the housing and the wire cover guides the wire bundle in a predetermined direction. A band is wound around the bundle of wires and the binding member, and has a lock that locks the band at a predetermined position to fix the bundle of wires against the binding member. The band extends from a first outer surface of the lock and is inserted into the interior of the lock from a second surface of the lock to be locked. A first positioning portion is provided for contacting the first surface of the lock and a second positioning is provided for contacting the second surface of the lock.

According to the invention, a movement of the lock toward one side in a circumferential direction of the binding member is limited by the first positioning portion and a movement of the lock portion toward the other side in the circumferential direction of the binding member is limited by the second positioning portion. Thus, the binding member that binds the bundle of wires can be positioned in the circumferential direction.

The wire cover may include a band inserting portion that defines a route for the binding member. The band inserting portion includes a guiding surface inclined to guide the band into the interior of the lock. According to this configuration, the band can be inserted smoothly into the interior of the lock so that a winding operation of the binding member can be performed easily.

The band inserting portion may have a hole that allows passage of the band therethrough, while being closed over the entire circumference. Thus, the binding member cannot be detached from the band inserting portion, and the bundle of wires is held reliably by the binding member.

The first or second surface of the lock may be rectangular shape. Additionally, the first or second positioning portion may be L-shaped for contacting two peripheral edge parts of the first or second surface substantially at a right angle to each other. According to this configuration, the first or second positioning portion is held in contact with the first or second surface in horizontal and vertical directions so that the lock can be held in a correct posture.

The first or second positioning portion may be substantially parallel to the first or second surface of the lock. According to this configuration, the first positioning portion and the first surface or the second positioning portion and the second surface may achieve surface contact rather than point or line contact so that the lock portion can be positioned reliably.

DETAILED DESCRIPTION

Hereinafter, one specific embodiment of the present invention is described in detail with reference to FIGS. 1 to 19.

Figure 1:
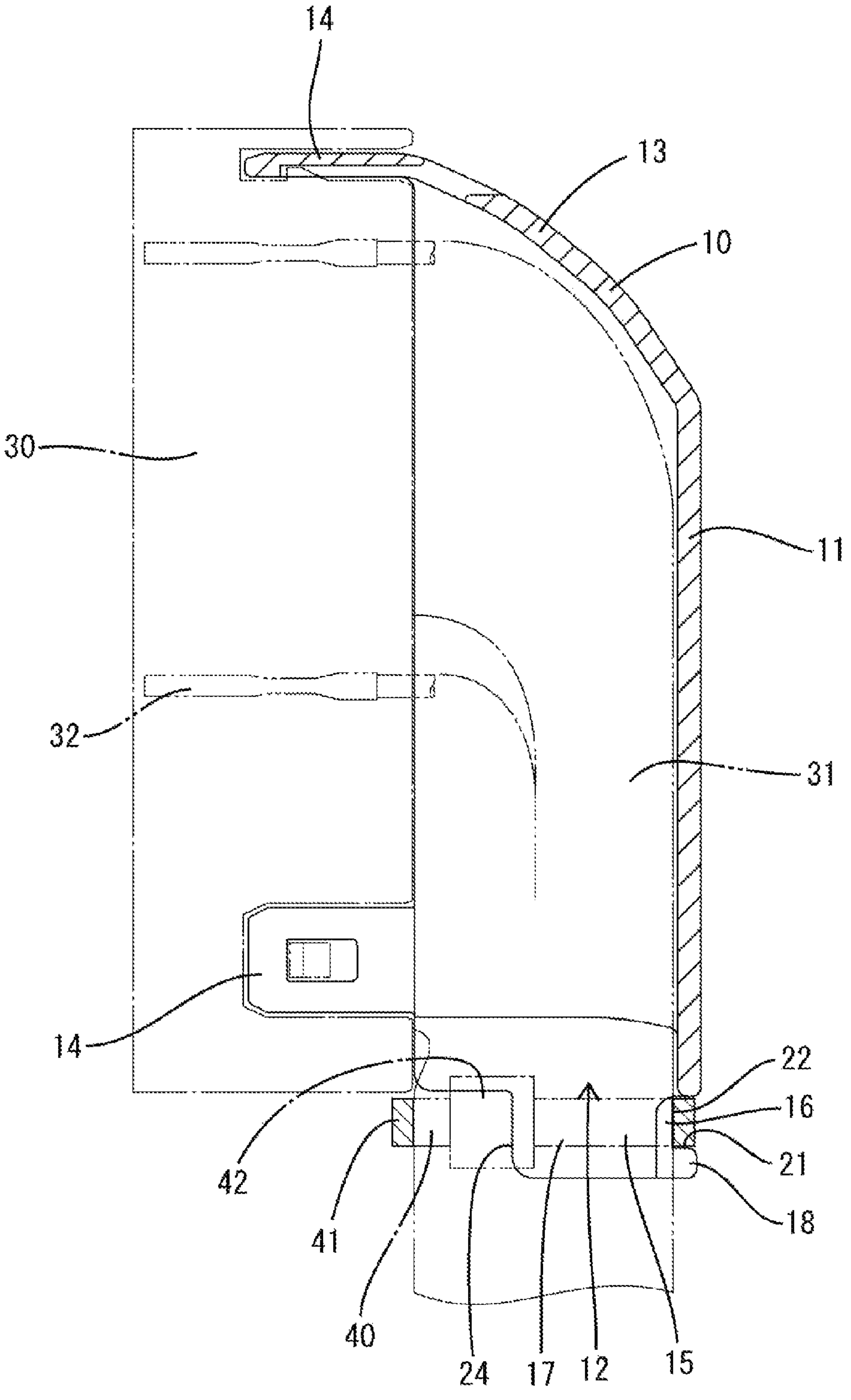
FIG. 1 is a section showing a state where a wire cover in an embodiment is mounted on a housing to fix a bundle of wires.
Figure 2:
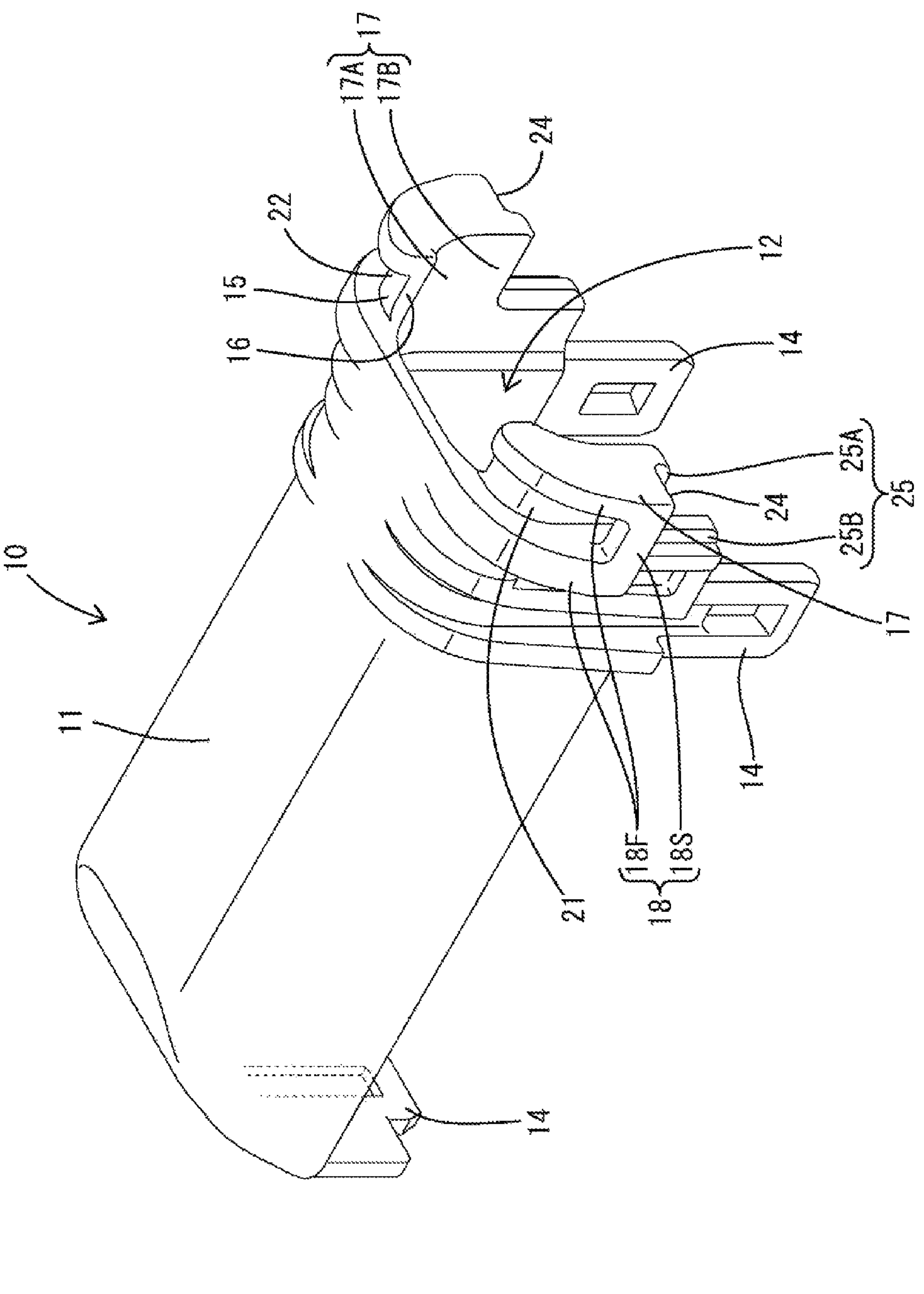
FIG. 2 is a perspective view showing the wire cover.
Figure 3:
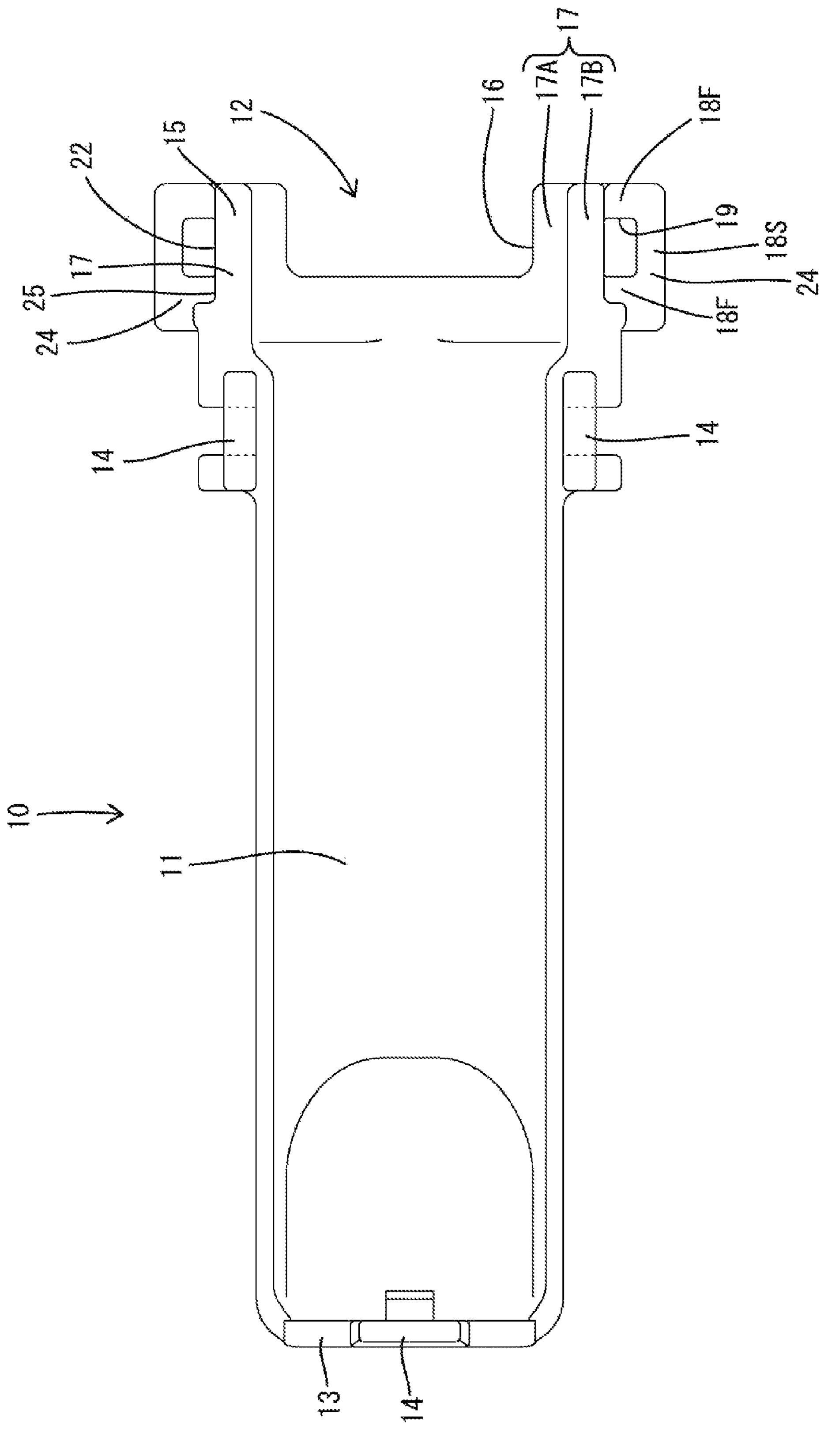
FIG. 3 is a front view showing the wire cover.

A wire cover 10 in this embodiment is mounted on a rear surface of a housing 30 such that a bundle of wires 31 pulled out from the rear surface of the housing 30 is guided in a predetermined direction. The bundle of wires 31 is fixed to the wire cover 10 by a binding member 40. In the following description, a left side and a right side of FIG. 1 are referred to as a front and a rear and a vertical direction and a lateral direction of FIG. 3 are referred to as a height direction and a width direction for each constituent member.

The housing 30 is made of synthetic resin and is substantially in the form of a rectangular parallelepiped long in the width direction. Terminal fittings 32 fixed to end parts of the wires 31 are accommodated into the housing 30 from behind.

The binding member 40 includes a band 41 to be wound around the bundle of the wires 31 and a lock 42 for locking the band 41 at a predetermined position. The band 41 has a length sufficient to be wound around the bundle of the wires 31 and to fix the bundle of the wires 31 to the wire cover 10.

Figure 10:
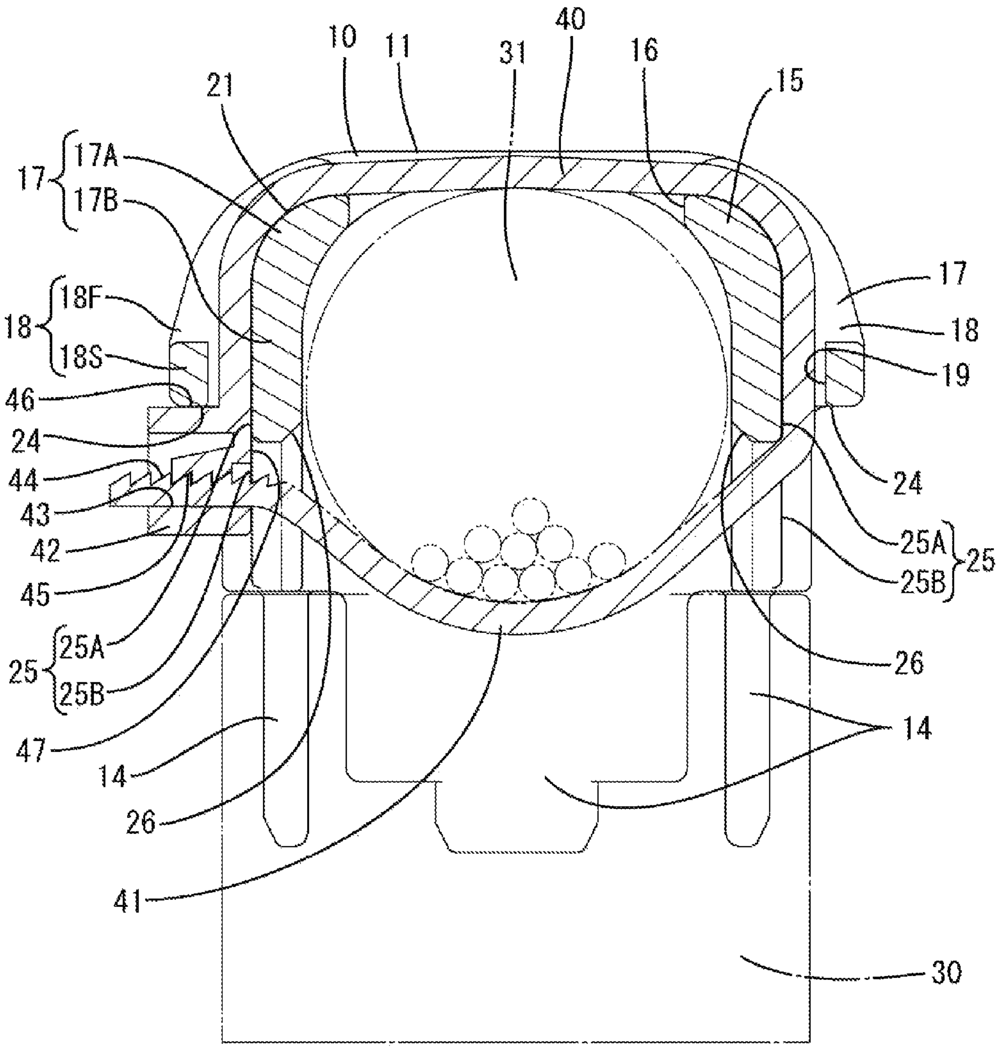
FIG. 10 is a section, corresponding to a cross-section at a position A-A of FIG. 5, of the wire cover in the state mounted on the housing to fix the bundle of wires.
Figure 11:
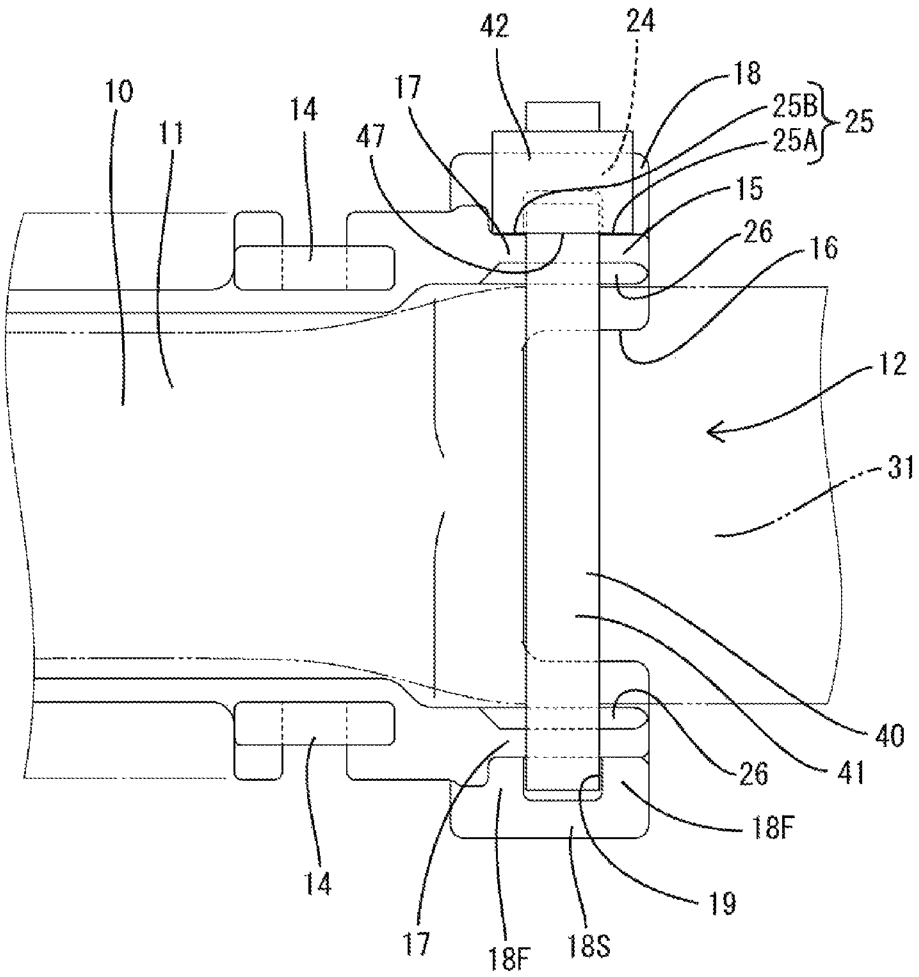
FIG. 11 is a partial enlarged front view showing a band inserting portion in a state where the bundle of wires is fixed.
Figure 12:
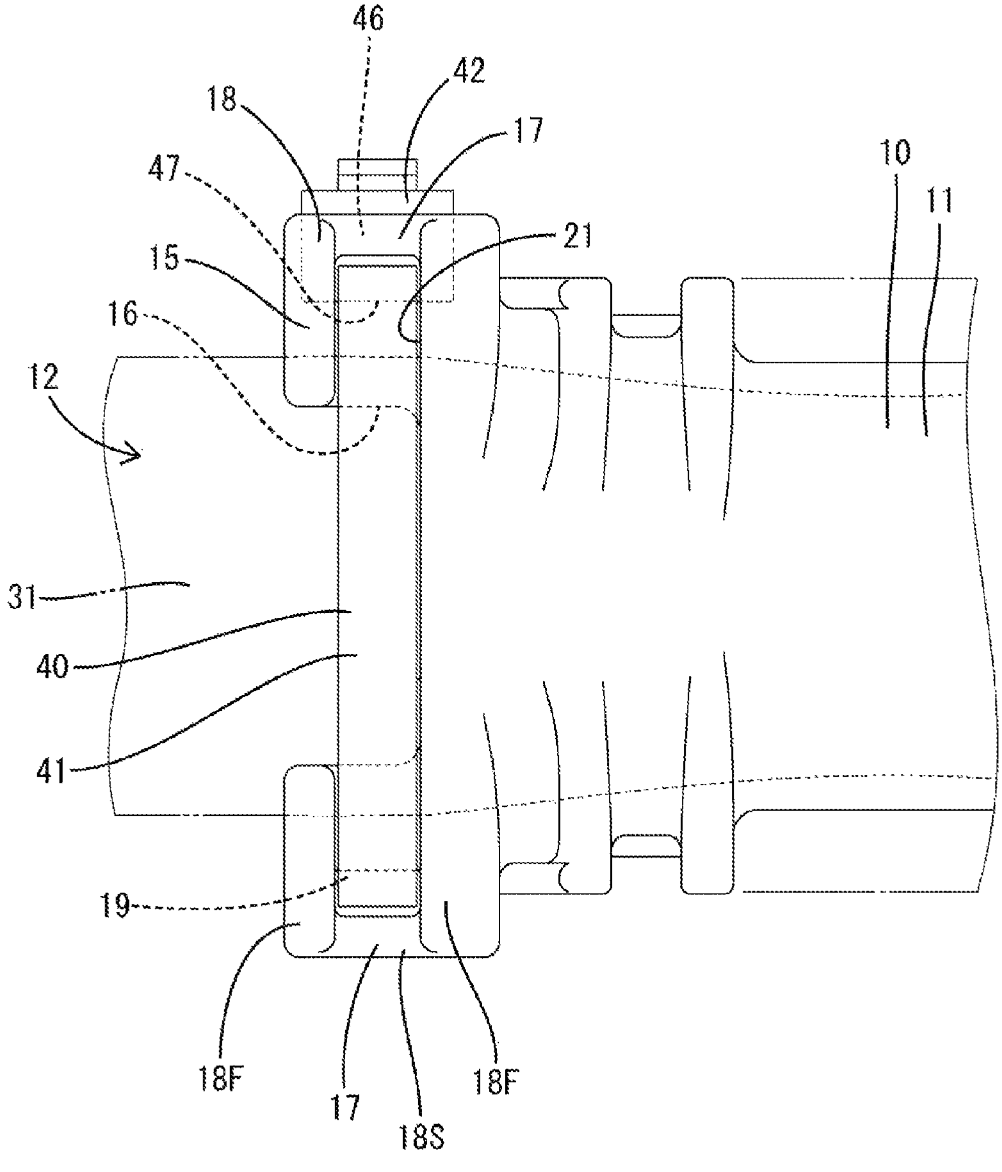
FIG. 12 is a partial enlarged rear view showing the band inserting portion in the state where the bundle of wires is fixed.

The lock 42 is in the form of a rectangular block and is provided internally with an insertion hole 43 into which the band 41 is to be inserted (see FIG. 10). The insertion hole 43 is provided with a lock receiving portion 45 for fixing a tip part of the band portion 41 by being locked to locking portions 44 provided on the band 41.

The lock 42 has six rectangular outer surfaces. The band 41 extends in one direction from a first outer surface 46 of the lock 42 and is inserted into the insertion hole 43 from a second outer surface 47 of the lock 42 to be locked. The first and second surfaces 46, 47 are substantially perpendicular to each other. The band 41 extends from a corner edge where the first and second surfaces 46, 47 intersect on a side of the first surface 46 adjacent to the second surface 47. The band 41 is inserted into the insertion hole 43 from a central part of the second surface 47.

The wire cover 10 is made of synthetic resin and defines a box that is long in the width direction. The wire cover 10 is symmetrical with respect to a center in the height direction.

The wire cover 10 includes a cover main body 11 for covering substantially the entire rear surface of the housing 30. The cover main body 11 is long in the width direction, and has one side in the width direction that is open by a wire pull-out opening 12 and the other side is closed by a wall 13 (see FIG. 1). The bundle of the wires 31 pulled out backward from the rear surface of the housing 30, is bent substantially at a right angle in the cover main body 11 and is pulled out to outside (in a direction substantially parallel to the rear surface of the housing 30) through the wire pull-out opening 12.

The cover main body 11 is provided with a plurality of lock pieces 14 to be locked to a rear part of the housing 30. Each lock piece 14 projects forward from the cover main body 11. The lock pieces 14 are provided on opposite end parts of the cover main body 11 in the width direction. Two of the lock pieces 14 are provided on the end part on the side of the wire pull-out opening 12 while being spaced apart from each other in the height direction.

The wire cover 10 has a band inserting portion 15 through which the binding member 40 is to be passed. The band inserting portion 15 is provided at the wire pull-out opening 12 adjacent to the lock pieces 14. The band inserting portion 15 has a curved shape to extend along a part of the outer surface of the bundle of the wires 31 in a circumferential direction and is open forward.

Figure 4:
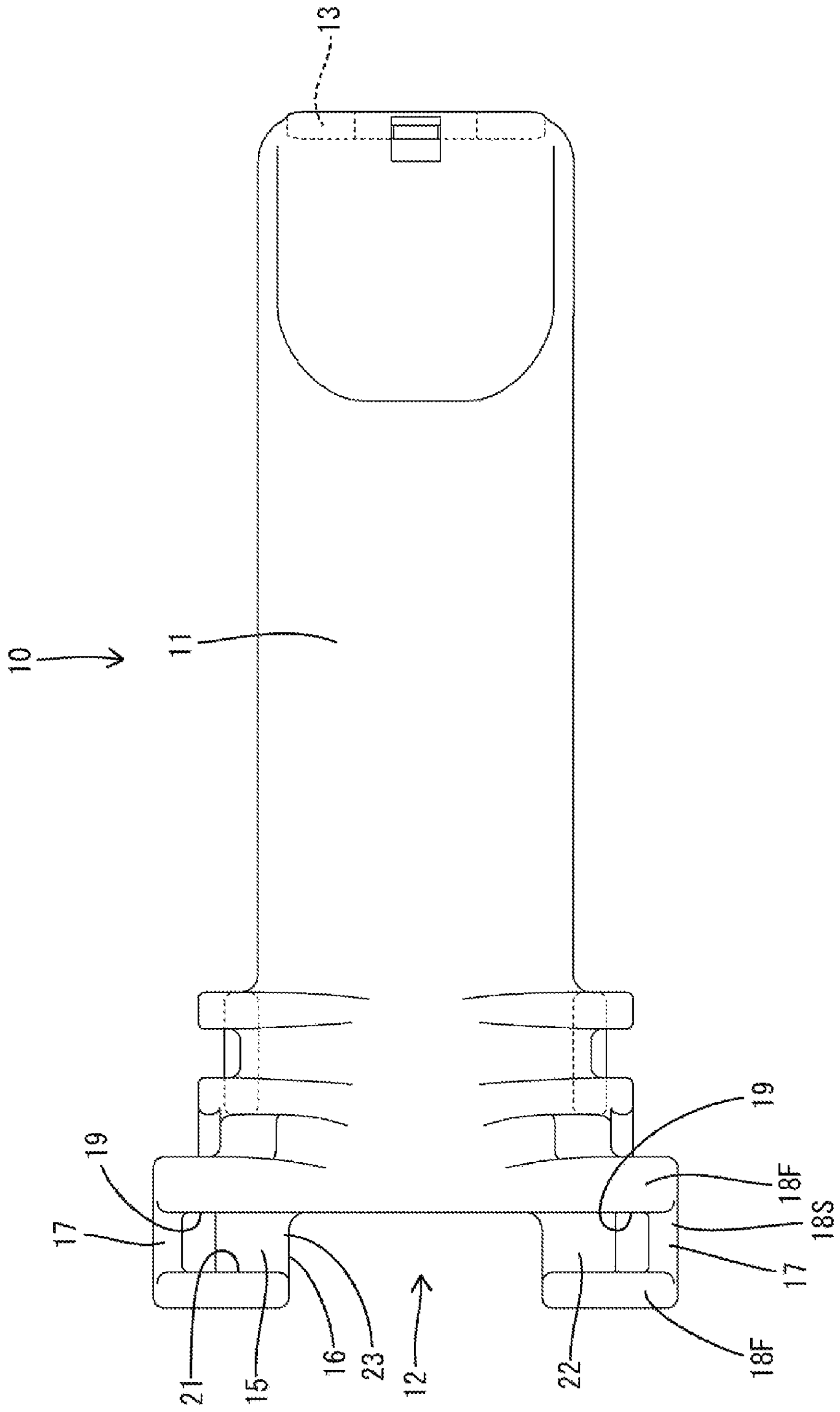
FIG. 4 is a rear view showing the wire cover.
Figure 5:
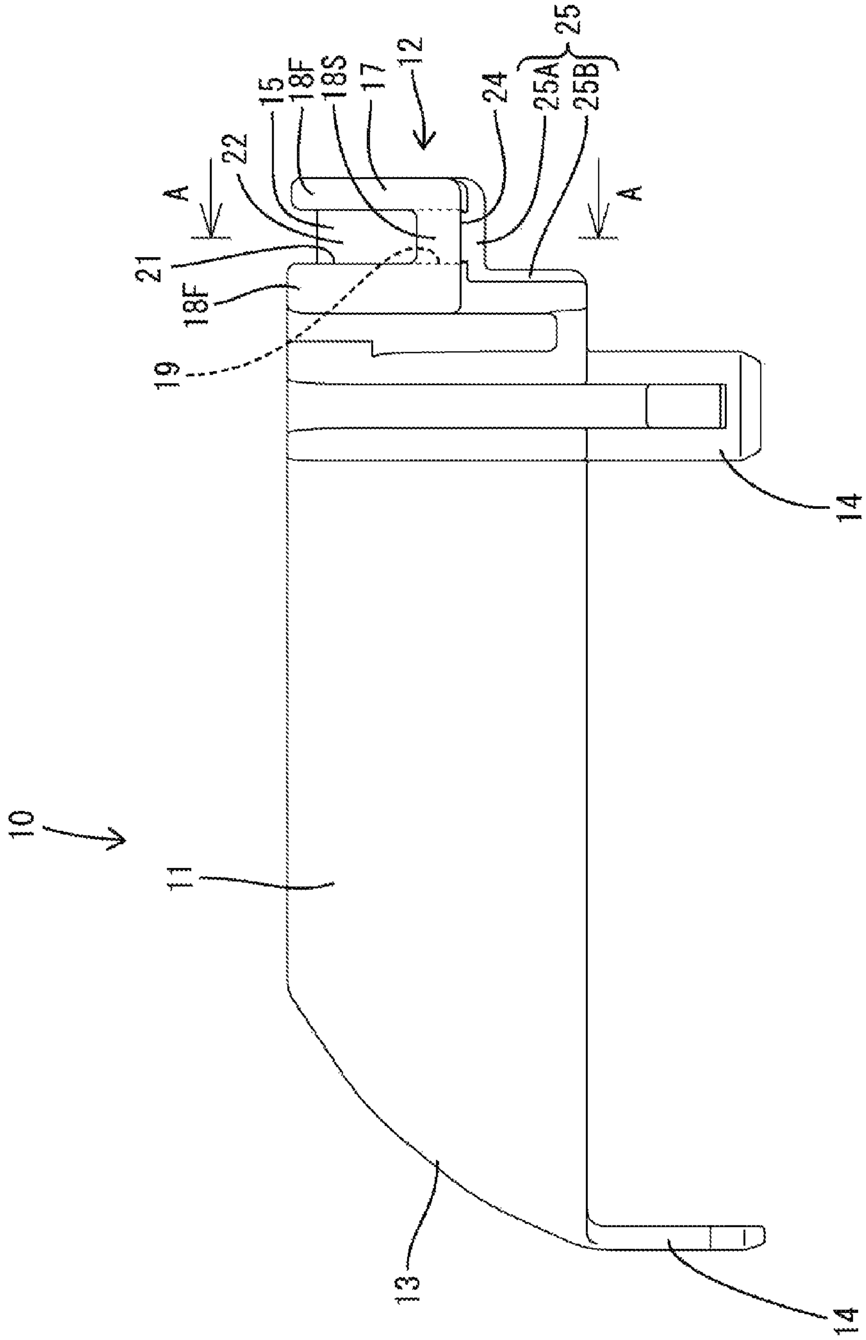
FIG. 5 is a plan view showing the wire cover.
Figure 6:
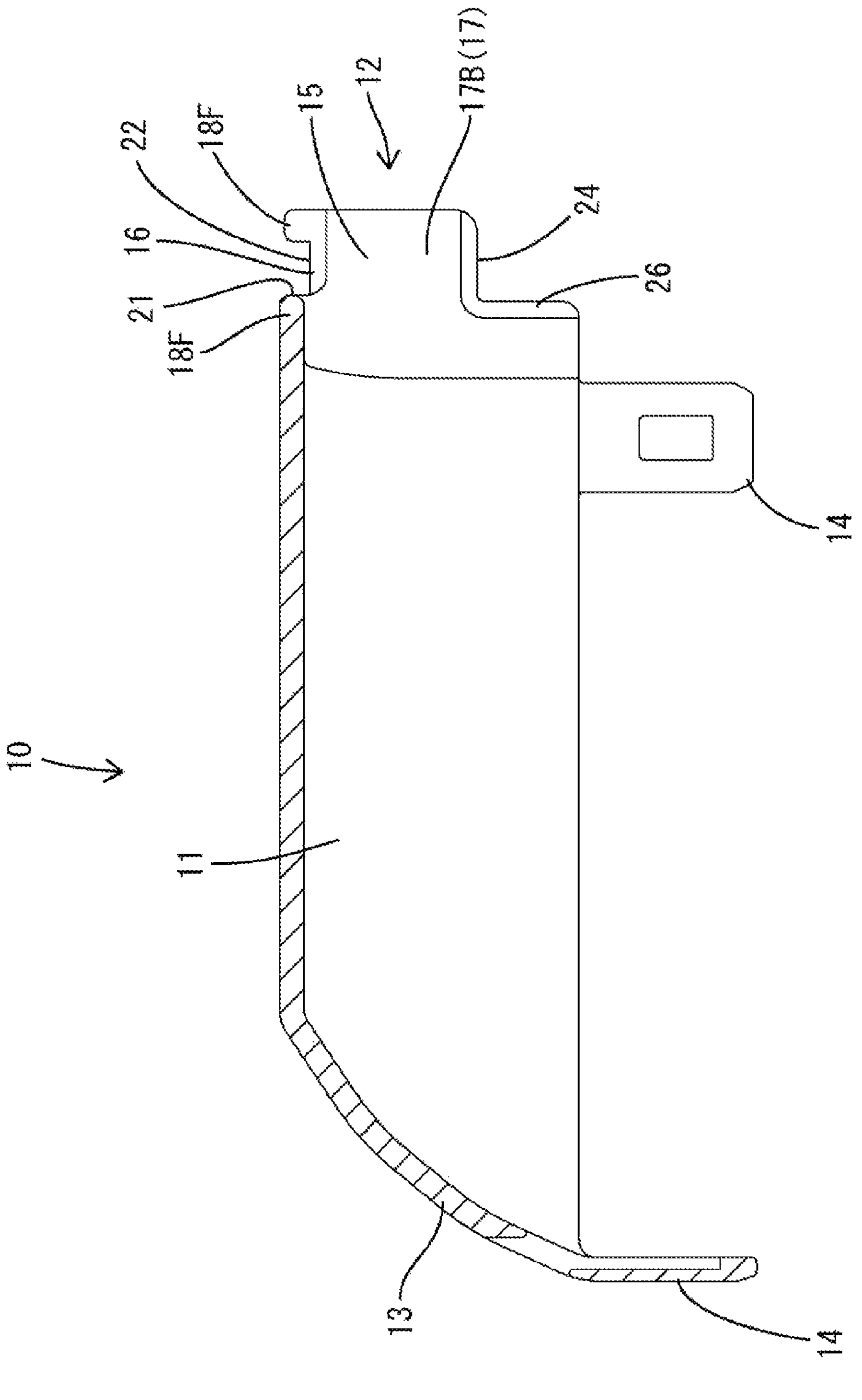
FIG. 6 is a section showing the wire cover.
Figure 7:
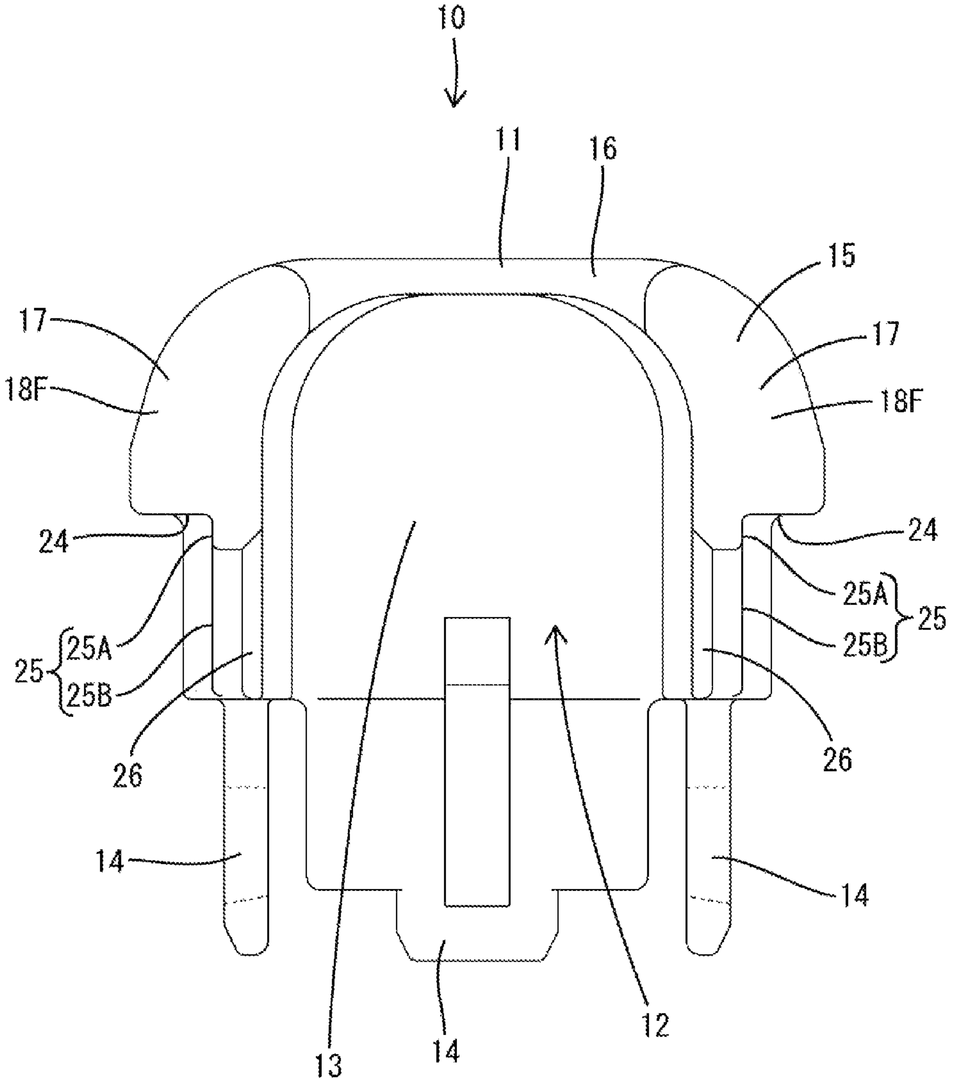
FIG. 7 is a side view showing a wire pull-out opening side of the wire cover.
Figure 8:
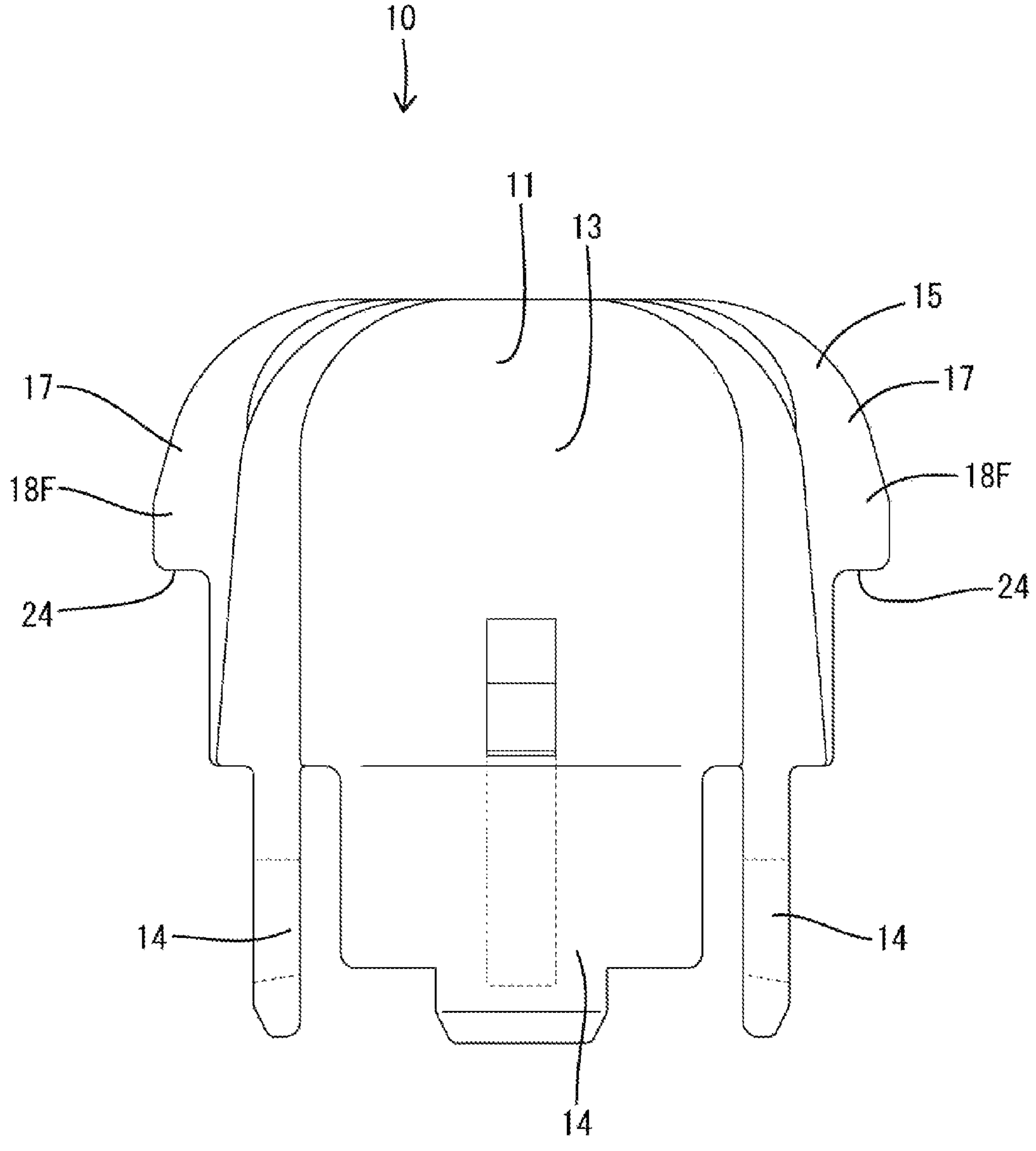
FIG. 8 is a side view showing a closed side of the wire cover.

The band inserting portion 15 has a cut 16 allowing the inside and outside of the band inserting portion 15 to communicate in an in-out or front-back direction. The cut 16 is at an intermediate part of the band inserting portion 15 in the height direction and in the circumferential direction. The cut 16 defines a rectangle that is long in the height direction when viewed from behind (FIG. 4).

Lock fixing portions 17 for positioning the lock 42 of the binding member 40 are provided at opposite end parts of the band inserting portion 15 in the height direction. Each lock fixing portion 17 has a quarter-circular curved shape.

As shown in FIG. 10, the lock fixing portion 17 includes an arcuate portion 17A provided adjacent to the cut 16 and a projecting portion 17B projecting forward from a circumferential end (front end) of the arcuate portion 17A.

The lock fixing portion 17 is provided with a reinforcing portion 18. The reinforcing portion 18 is projects out at the lock fixing portion 17. The reinforcing portion 18 includes two first reinforcing portions 18F that extend in the circumferential direction of the band inserting portion 15 and a second reinforcing portion 18S coupling the two first reinforcing portions 18F.

The first reinforcing portions 18F are substantially parallel and face each other while being spaced apart by a distance matching a width of the band 41 so that the first reinforcing portions 18F extend along opposite side edges of the band 41. The first reinforcing portion 18F is a wall continuously formed from an end edge of the arcuate portion 17A on the side of the cut 16 to a position slightly closer to a central side (rear side) than the front end of the projecting portion 17B. A wall thickness of the first reinforcing portion 18F is substantially constant. A projecting dimension of the first reinforcing portion 18F is largest at the front end. The front end surface of the first reinforcing portion 18F is substantially at a right angle to the front-back direction.

One of the first reinforcing portions 18F extends along an end edge of the wire cover 10 and the other is along the cut 16 (see FIG. 4). The outer surface of a central part of the first reinforcing portion 18F provided along the cut 16 in the height direction is connected to the outer surface of the cover main body 11 without forming a step (see FIG. 6). The first reinforcing portion 18F provided along the end edge of the wire cover 10 is divided by the cut 16.

The second reinforcing portion 18S couples outer sides of front end parts of the pair of first reinforcing portions 18F. The front end surface of the second reinforcing portion 18S is connected to front ends of the first reinforcing portions 18F without forming a step and is at a substantially right angle to the front-back direction.

The band 41 of the binding member 40 is wound around a groove 21 formed between two reinforcing walls. A bottom surface 22 of the groove 21 is located slightly inwardly of the outer side surface of the cover main body 11.

The band inserting portion 15 is provided with holes 19 through which the band 41 of the binding member 40 can be passed (see FIG. 10). The hole 19 is surrounded by the first reinforcing portions 18F, the second reinforcing portion 18S and the projecting portion 17B and closed over the entire circumference. The hole 19 penetrates in the front-back direction (circumferential direction of the band inserting portion 15) and opens on a first positioning portion 24 to be described later.

The band inserting portion 15 includes first positioning portions 24 that can contact the first surface 46 of the lock 42, and second positioning portions 25 that can contact the second surface 47 of the lock 42.

The first positioning portion 24 is formed by the front surfaces of the first reinforcing portions 18F and the second reinforcing portion 18S and is U-shaped (see FIG. 3). The first positioning portion 24 is an even flat surface substantially at a right angle to the front-back direction. A width (lateral dimension in FIG. 11) of the first positioning portion 24 is larger than a width of the first surface 46 of the lock 42 and a dimension of the first positioning portion 24 in an in-out direction (dimension in the vertical direction in FIG. 11) is slightly smaller than that of the first surface 46 of the lock 42 in the same direction. The first positioning portion 24 contacts a part of the first surface 46 around the band 41 (outer side and opposite widthwise sides of the band 41). Note that the first positioning portion 24 contacts a part of the first surface 46 more outward than a central part in the in-out direction.

Figure 13:
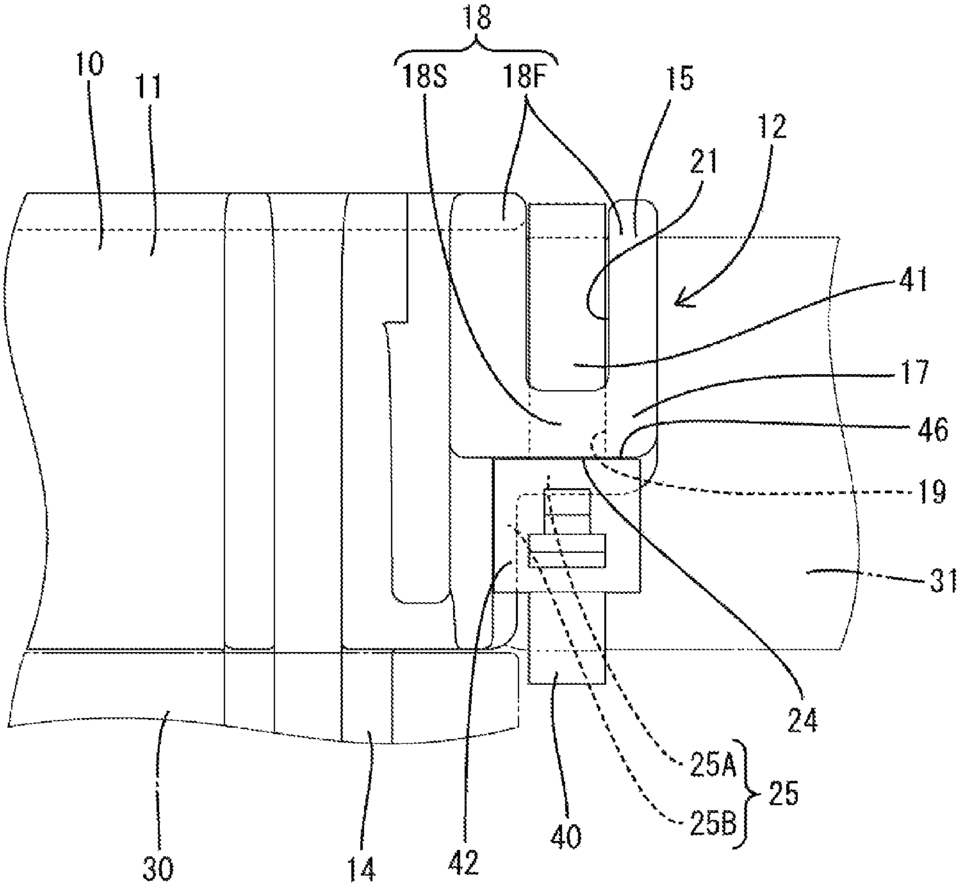
FIG. 13 is a partial enlarged plan view showing the band inserting portion in the state where the bundle of wires is fixed.

The second positioning portion 25 is L-shaped to be able to contact two peripheral edges of the second surface 47 substantially at a right angle to each other (see FIG. 13). The second positioning portion 25 includes a horizontal portion 25A that is long in the width direction along the first positioning portion 24 and a vertical portion 25B that is long in the front-back direction along a peripheral edge of the wire pull-out opening 12. The horizontal portion 25A and the vertical portion 25B are substantially at a right angle to each other.

The horizontal portion 25A is formed by an outer side surface of the projecting portion 17B of the lock fixing portion 17 projecting farther forward than the first positioning portion 24. The horizontal portion 25A is provided from an end of the band inserting portion 15 in the width direction to an opposite side beyond the hole 19. The vertical portion 25B is provided from the first positioning portion 24 to the front end of the cover main body 11. The vertical portion 25B is narrower than the horizontal portion 25A.

The first and second positioning portions 24, 25 are substantially perpendicular to each other (see FIG. 10) and are substantially parallel to the first and second surfaces 46, 47.

The band inserting portion 15 is provided with guiding surfaces 26 inclined to guide the band portion 41 of the binding member 40 into the insertion hole 43 of the lock portion 42 (see FIG. 10). The guiding surface 26 is provided on an inner side of the second positioning portion 25. The guiding surface 26 is an inclined surface formed by obliquely cutting a corner part located on the inner side of the second positioning portion 25 (corner part between the projecting portion 17B and the cover main body 11). The guiding surface 26 is provided continuously from an end edge (right end edge in FIG. 6) of the projecting portion 17B to an end edge (lower end edge in FIG. 6) of the cover main body 11.

An operation of fixing the bundle of the wires 31 to the wire cover 10 is described below.

Figure 9:
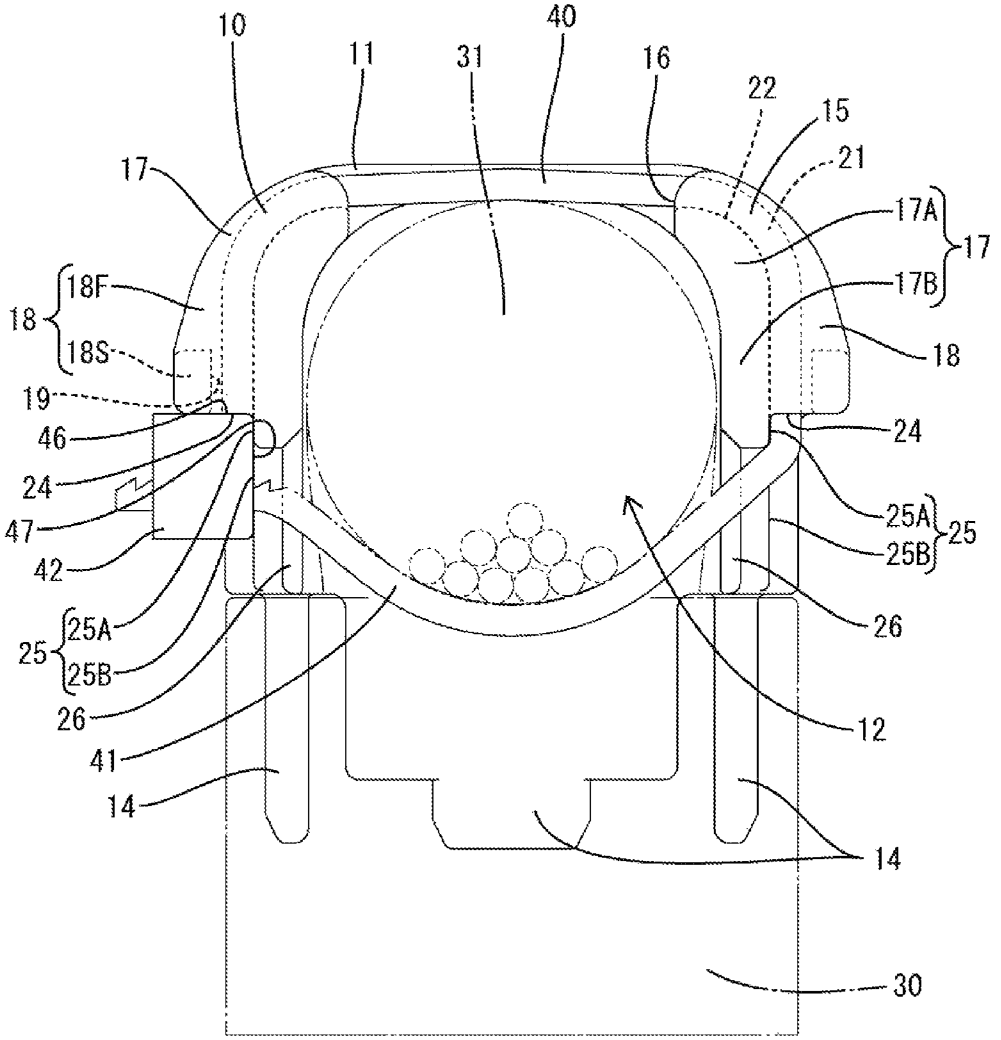
FIG. 9 is a side view showing the wire pull-out opening side of the wire cover in the state mounted on the housing to fix the bundle of wires.
Figure 14:
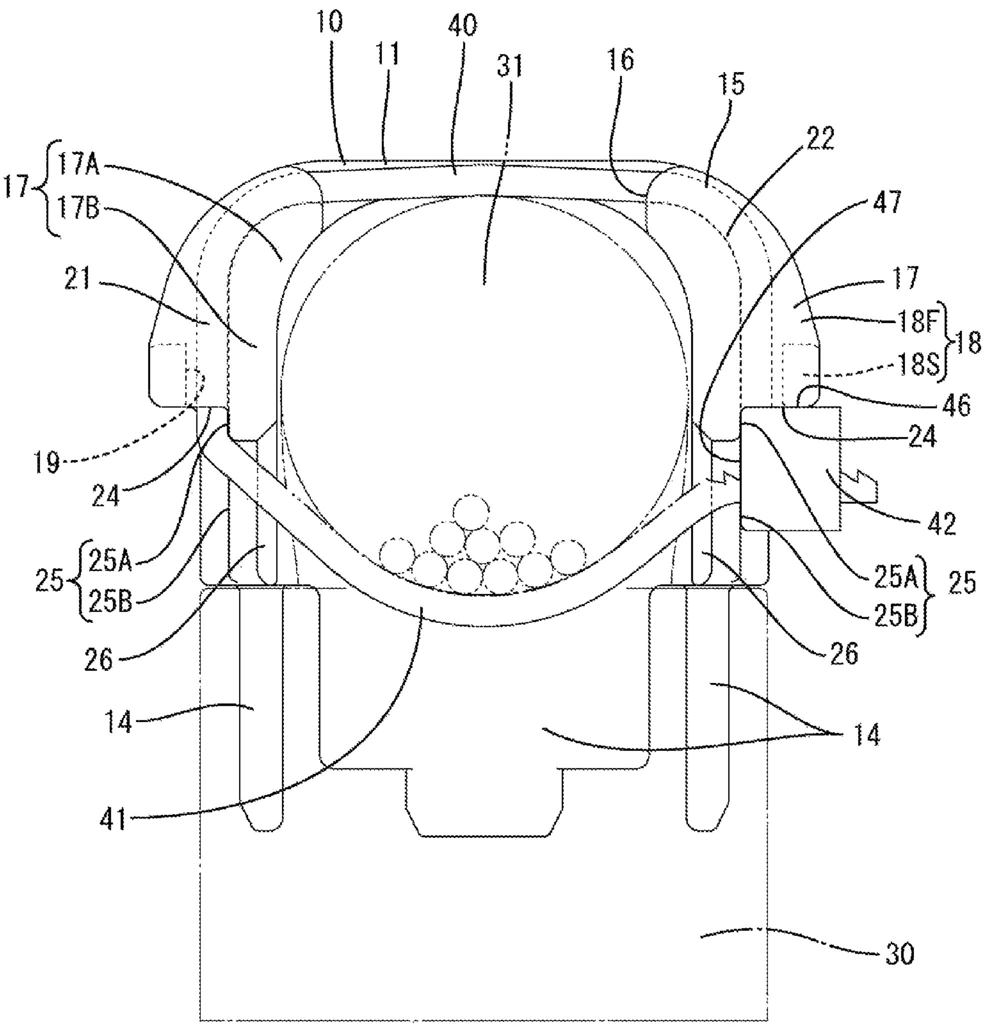
FIG. 14 is a side view showing the wire pull-out opening side of the wire cover in a state mounted on the housing to fix the bundle of wires from an opposite side.
Figure 15:
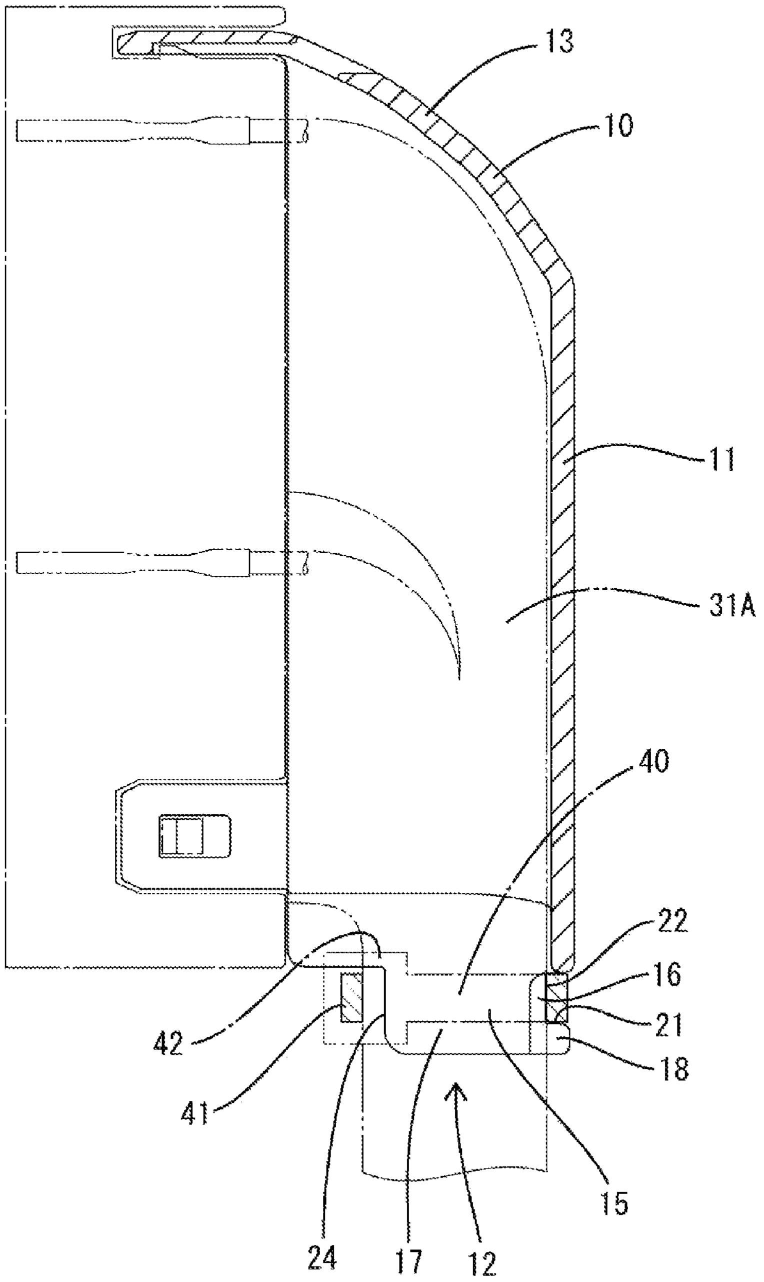
FIG. 15 is a section showing the wire cover in a state mounted on the housing to fix a bundle of thin wires.

First, the binding member 40 is wound so that the bundle of the wires 31 extends along the inner surface of the band inserting portion 15. At first, the band 41 of the binding member 40 is passed through the hole 19 of the lock fixing portion 17 from the front and pulled backward. At this time, as shown in FIG. 9 or 14, the band 41 can be passed through the hole 19 of the lock fixing portion 17 located on a side where the operation is performed easily. When the band 41 is pulled backward, the first surface 46 of the lock 42 contacts the first positioning portion 24 from the front to be stopped. At this time, the second surface 47 of the lock 42 faces the second positioning portion 25.

Subsequently, the band 41 is brought to the side of the other lock fixing portion 17, passed through the hole 19 of the other lock fixing portion 17 from behind and pulled forward. Then, the band 41 extends across the cut 16 without loosening and is held in close contact with the bottom surface 22 of the groove 21. The band 41 extending forward from the hole 19 is wound around a front of the bundle of the wires 31 and inserted into the insertion hole 43 of the lock 42. At this time, even if the tip of the band 41 is displaced slightly back from insertion hole 43 or toward the cover main body 11, the tip of the band 41 contacts the guiding surface 26, displaced toward the insertion hole 43 by the inclination of the guiding surface 26 and inserted into the insertion hole 43.

When the band 41 projecting toward an opposite side of the lock 42 through the insertion hole 43 of the lock 42 is pulled strongly and tightened, a force acts in an inward direction (force resisting the tightening of the band 41, rightward force in FIG. 9) on the lock portion 42. However, since the second surface 47 of the lock 42 is held in contact with the second positioning portion 25, an inward movement of the lock 42 is limited. Thus, the binding member 40 is held at a fixed position without being displaced in the circumferential direction.

The bundle of the wires 31 is pressed backward by the band 41 wound around the front side and strongly pressed against the inner surfaces of the band 41 extending across the cut 16 and the band inserting portion 15. The band 41 tightens the bundle of the wires 31 and is held in a tightening state by having the loosening thereof limited by the lock 42.

In the above way, the operation of fixing the bundle of the wires 31 to the wire cover 10 is completed. With the bundle of the wires 31 fixed to the wire cover 10, the band 41 is passed through the two holes 19 at opposite ends in the height direction. Thus, even if the bundle of the wires 31 is shaken strongly, the binding member 40 is not detached from the band inserting portion 15 and held in a reliably fixed state. Further, the band portion 41 wound around the band inserting portion 15 is accommodated in the groove 21 without projecting toward a side behind the wire cover 10. By passing the band 41 through the holes 19, the detachment of the binding member 40 from the band inserting portion 15 can be prevented.

Figure 16:
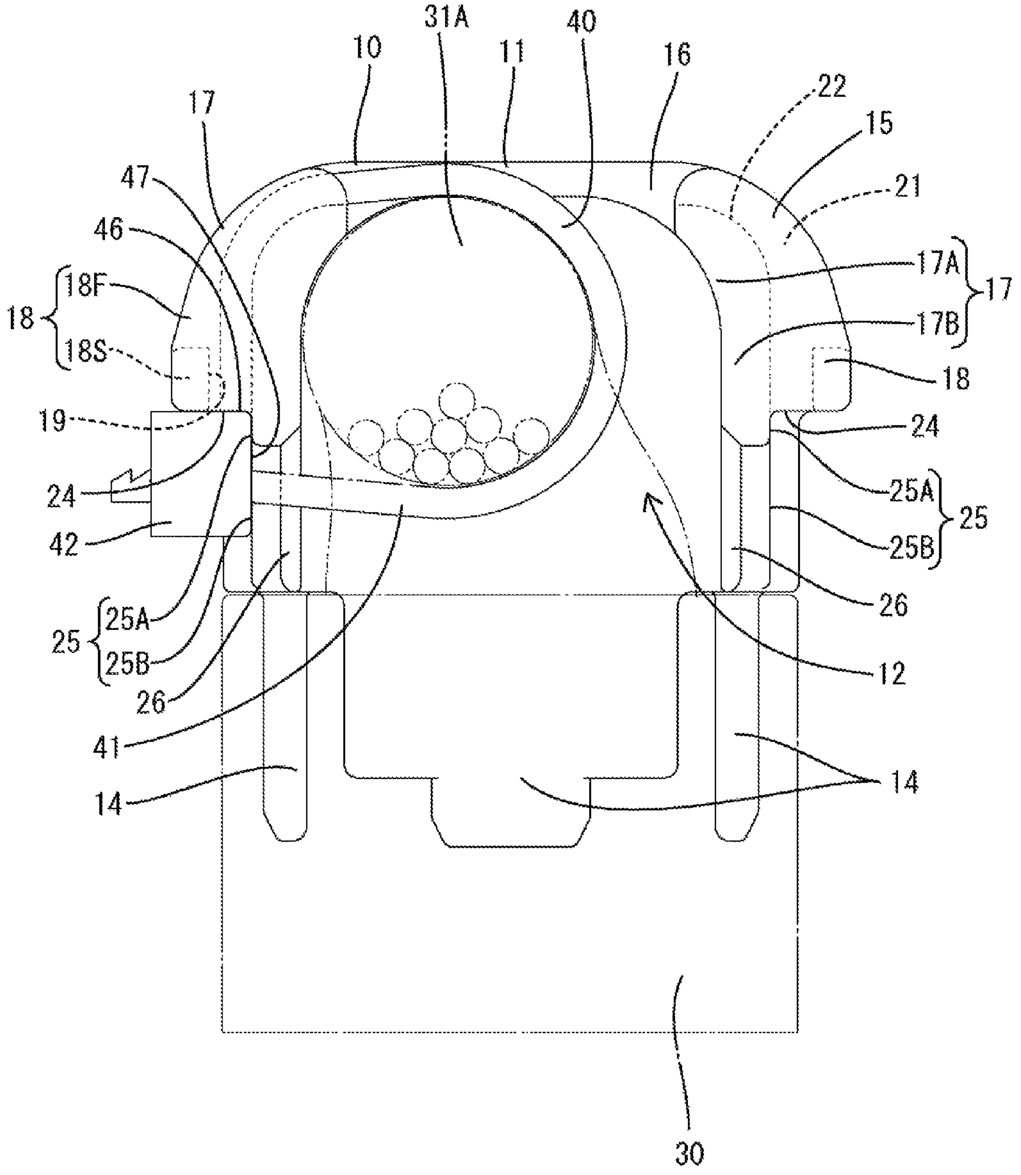
FIG. 16 is a side view showing the wire pull-out opening side of the wire cover in the state mounted on the housing to fix a bundle of thin wires.
Figure 17:
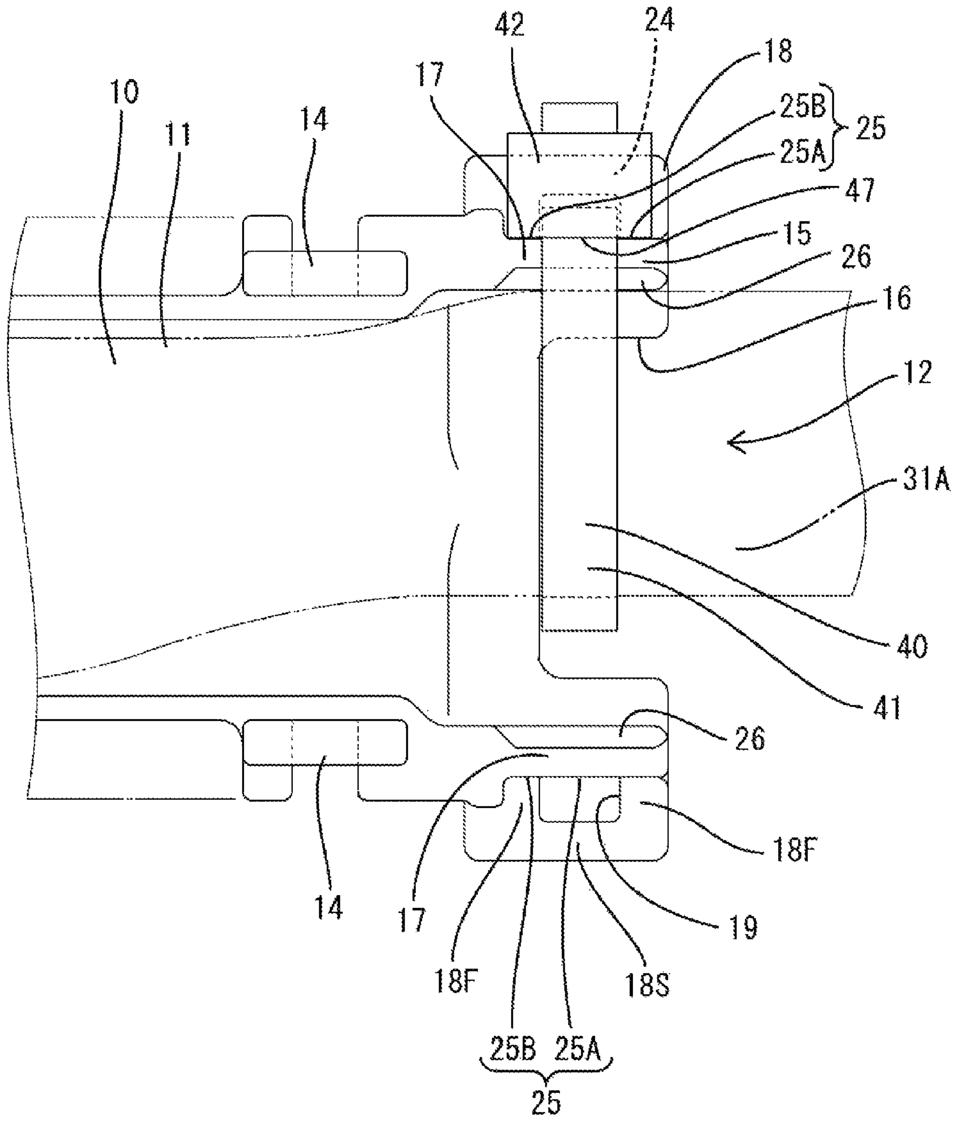
FIG. 17 is a partial enlarged front view showing the band inserting portion in a state where the bundle of thin wires is fixed.
Figure 18:
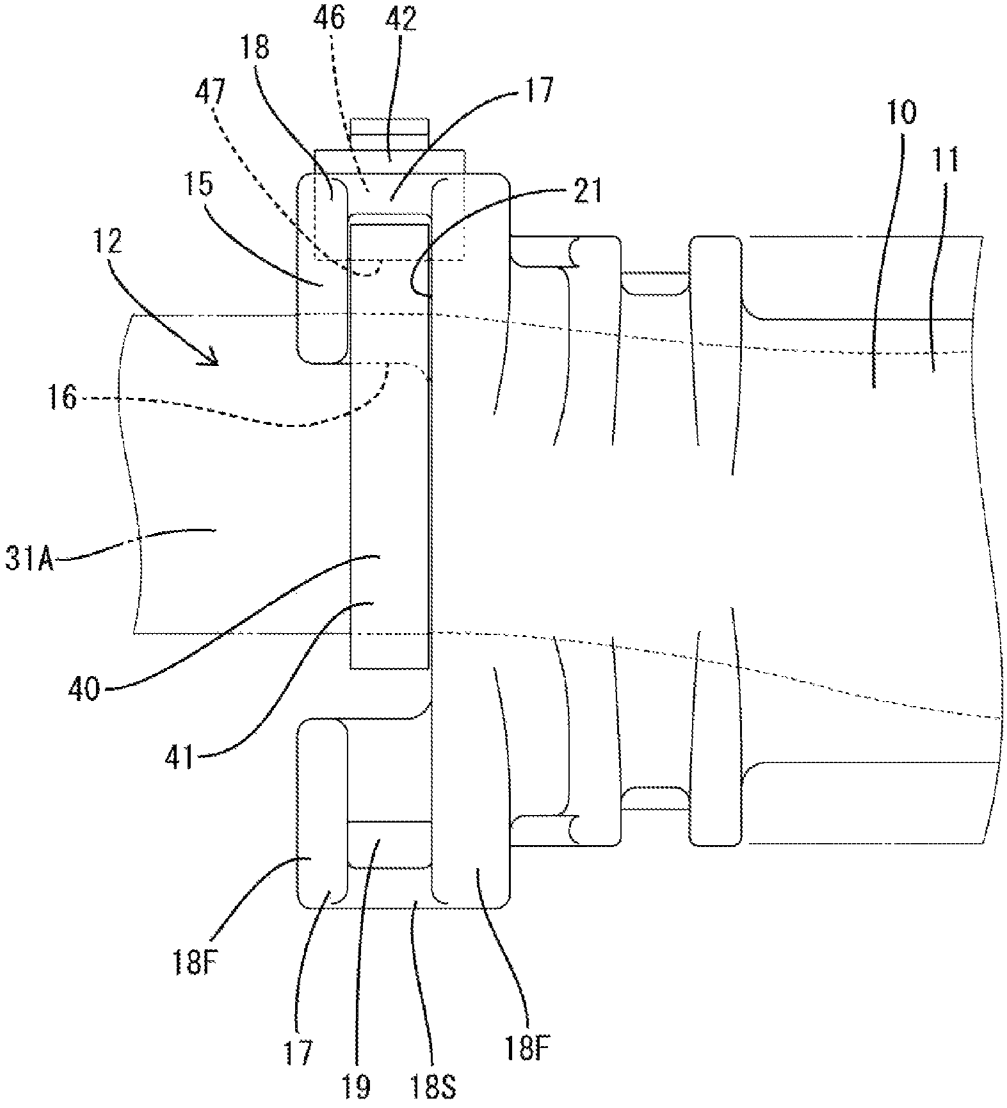
FIG. 18 is a partial enlarged rear view showing the band inserting portion in the state where the bundle of thin wires is fixed.
Figure 19:
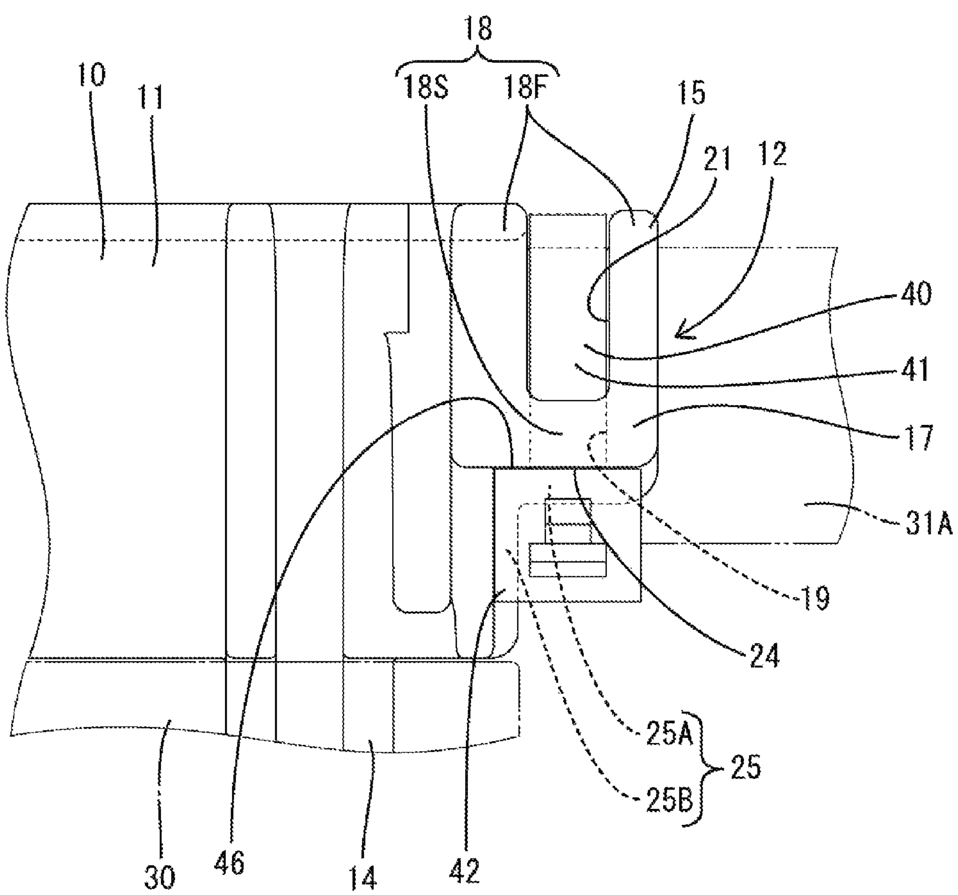
FIG. 19 is a partial enlarged plan view showing the band inserting portion in the state where the bundle of thin wires is fixed.

If the wires 31 are thin wires 31A having a small diameter, a radius of the bundle of the thin wires 31A is small. Thus, if the band 41 is passed through both holes 19 of lock fixing portions 17, a large clearance is formed between the bundle of the thin wires 31A and the band inserting portion 15 and the bundle of the thin wires 31A cannot be tightened sufficiently. However, the band 41 can be passed through the hole 19 of only one of the lock fixing portions 17 and wound around the bundle of the thin wires 31A. Specifically, after the band 41 of the binding member 40 is passed through the hole 19 of one lock fixing portion 17 from the front and pulled back to position the lock 42 as shown in FIG. 16, the band 41 is turned inwardly of the band inserting portion 15 and wound round the bundle of the thin wires 31A in the cut portion 16, and inserted into the lock 42 and tightened. The bundle of the thin wires 31A is pressed strongly against the inner surface of the one lock fixing portion 17 by the band 41 and is fixed firmly.

Next, functions and effects of the embodiment configured as described above are described.

The wire cover 10 is mounted on the rear surface side of the housing 30 to pull out the bundle of the wires 31 in the predetermined direction from the rear surface of the housing 30, and the bundle of the wires 31 is fixed by the binding member 40 including the band 41 to be wound around the bundle of the wires 31 and the lock 42 for locking the band 41 at the predetermined position. The band 41 extends from the first outer surface 46 of the lock 42 and is inserted into the interior of the lock 42 from the second outer surface 47 of the lock 42 to be locked. The wire cover 10 includes the first positioning portions 24 for contacting the first surface 46 of the lock 42 and the second positioning portions 25 for contacting the second surface 47 of the lock 42.

According to this configuration, a movement of the lock 42 toward one side in the circumferential direction of the binding member 40 is limited by the first positioning portion 24 and a movement of the lock 42 toward the other side in the circumferential direction of the binding member 40 is limited by the second positioning portion 25. Thus, the binding member 40 binding the bundle of the wires 31 can be positioned in the circumferential direction.

Further, the band inserting portion 15 to which the binding member 40 is to be fixed includes the guiding surfaces 26 inclined to guide the band portion 41 into the interior of the lock portion 42. According to this configuration, since the band 41 can be inserted smoothly into the interior of the lock 42, a winding operation of the binding member 40 can be performed easily.

Further, the band inserting portion 15 to which the binding member 40 is to be fixed is provided with the holes 19 allowing the passage of the band 41 therethrough and closed over the entire circumference. Thus, the binding member 40 is not detached from the band inserting portion 15, and can reliably hold the bundle of the wires 31 in the fixed state.

Further, the second surface 47 of the lock 42 is rectangular and the second positioning portion 25 is L-shaped to be able to come into contact with the two edge parts of the peripheral edge parts of the second surface 47 substantially at a right angle to each other. According to this configuration, since the second positioning portion 25 is held in contact with the second surface 47 in horizontal and vertical directions, the lock 42 can be held in a correct posture.

The first and second positioning portions 24, 25 are surfaces substantially parallel to the first and second surfaces 46, 47 of the lock 42. Accordingly, the first positioning portions 24 and the first surface 46 and the second positioning portions 25 and the second surfaces 47 achieve surface contact rather than point or line contact, and the lock 42 can be positioned reliably.

The invention is not limited to the above described and embodiment. For example, the following embodiments also are included in the scope of the invention.

Although the wire cover 10 configured so that the bundle of the wires 31 is bent substantially in parallel to the rear surface of the housing 30 is illustrated in the above embodiment, there is no limitation to this. The invention can be applied to a wire cover configured such that e.g. a bundle of wires is pulled out straight back from the rear surface of a housing.

Although the holes 19 are open on the first positioning portions 24 in the above embodiment, there is no limitation to this. The hole may be provided on any part of the band inserting portion and may be, for example, provided on the second positioning portion.

Although the first positioning portion 24 has a substantially U shape by the first reinforcing portions 18F and the second reinforcing portion 18S in the above embodiment. However, the shape of the first positioning portion can be changed and may, for example, be formed into an L shape capable of coming into contact of two peripheral edge parts of the first surface.

The first and second positioning portions 24, 25 are provided on the opposite end parts of the band inserting portion 15 in the circumferential direction in the above embodiment. However, the first and second positioning portions may be provided only on one end part of the band inserting portion in the circumferential direction.

The first and second surfaces 46, 47 of the lock 42 are substantially at a right angle to each other in the above embodiment. However, the first and second surfaces of the lock portion may be substantially parallel to each other, i.e. the band portion may extend from one of a pair of substantially parallel surfaces out of the outer surfaces of the lock portion and be inserted into the interior of the lock portion from the other surface.

The band inserting portion 15 includes the guiding surfaces 26 inclined to guide the band 41 into the interior of the lock 42 in the above embodiment. However, the band inserting portion may not necessarily include the guiding surfaces.

The hole 19 is closed over the entire circumference in the above embodiment. However, the hole portion may be formed with an open part smaller than the width of the band portion.

The second positioning portion 25 is L-shaped to contact two edges of the peripheral edges of the second surface 47 substantially at a right angle in the above embodiment, there is no limitation to this. The shape of the second positioning portions can be arbitrarily changed.

The first and second positioning portions 24, 25 are substantially parallel to the first and second surfaces 46, 47 of the second lock 42. However, the first or second positioning portions 24, 25 may be shaped to achieve point or line contact with the first or second surface.

LIST OF REFERENCE SIGNS

10 wire cover
15 band insertion portion
19 hole
24 first positioning portion
25 second positioning portion
26 guiding surface
30 housing
31 wire
40 binding member
41 band
42 lock
46 first surface
47 second surface

What is claimed is:

1. A wire cover to be mounted on a rear surface of a housing and guiding a bundle of wires pulled out from the rear surface of the housing in a predetermined direction, comprising:

a binding member including a band to be wound around the bundle of wires and a lock for locking the band at a predetermined position for fixing the bundle of wires to the binding member, the band extending from a first surface outer surface of the lock and being inserted into the interior of the lock from a second outer surface of the lock to be locked; and a first positioning portion capable of contacting the first surface of the lock and a second positioning portion capable of contacting the second surface of the lock.

2. The wire cover of claim 1, further comprising a band inserting portion defining a route for the binding member and including a guiding surface inclined to guide the band into the interior of the lock.

3. The wire cover of claim 2, wherein the band inserting portion has a hole allowing passage of the band there through and being closed over an entire circumference.

4. The wire cover of claim 3, wherein the first or second surface of the lock has a rectangular shape and the first or second positioning portion is L-shaped to contact two peripheral edge parts of the first or second surface substantially at a right angle to each other.

5. The wire cover of claim 4, wherein the first or second positioning portion is a surface substantially parallel to the first or second surface of the lock.

* * * * *